Oct. 7, 1952 R. F. STEHLIK 2,613,275

AUTOMATIC CALL RECORDING SYSTEM FOR AUTOMATIC TELEPHONY

Filed April 25, 1947 5 Sheets-Sheet 1

INVENTOR
RUDOLPH FRANK STEHLIK

BY Chas. W. Candy
ATTORNEY.

Oct. 7, 1952 R. F. STEHLIK 2,613,275

AUTOMATIC CALL RECORDING SYSTEM FOR AUTOMATIC TELEPHONY

Filed April 25, 1947 5 Sheets-Sheet 2

INVENTOR
RUDOLPH FRANK STEHLIK

BY Chas. W. Candy
ATTORNEY

AUTOMATIC CALL RECORDING SYSTEM FOR AUTOMATIC TELEPHONY

Filed April 25, 1947 5 Sheets-Sheet 3

INVENTOR
RUDOLPH FRANK STEHLIK

BY Chas. W. Candy
ATTORNEY.

AUTOMATIC CALL RECORDING SYSTEM FOR AUTOMATIC TELEPHONY

Filed April 25, 1947 5 Sheets-Sheet 4

INVENTOR
RUDOLPH FRANK STEHLIK

BY Chas. W. Candy
ATTORNEY.

INVENTOR
RUDOLPH FRANK STEHLIK
BY Chas. W. Candy
ATTORNEY.

Patented Oct. 7, 1952 2,613,275

UNITED STATES PATENT OFFICE 2,613,275

AUTOMATIC CALL RECORDING SYSTEM FOR AUTOMATIC TELEPHONY

Rudolph Frank Stehlik, Antwerp, Belgium, assignor to Automatic Electric Laboratories, Inc., Chicago, Ill., a corporation of Delaware Application April 25, 1947, Serial No. 743,966
In Great Britain January 24, 1941

Section 1, Public Law 690, August 8, 1946
Patent expires January 24, 1961

17 Claims. (Cl. 179—7.1)

Figures 1, 6:
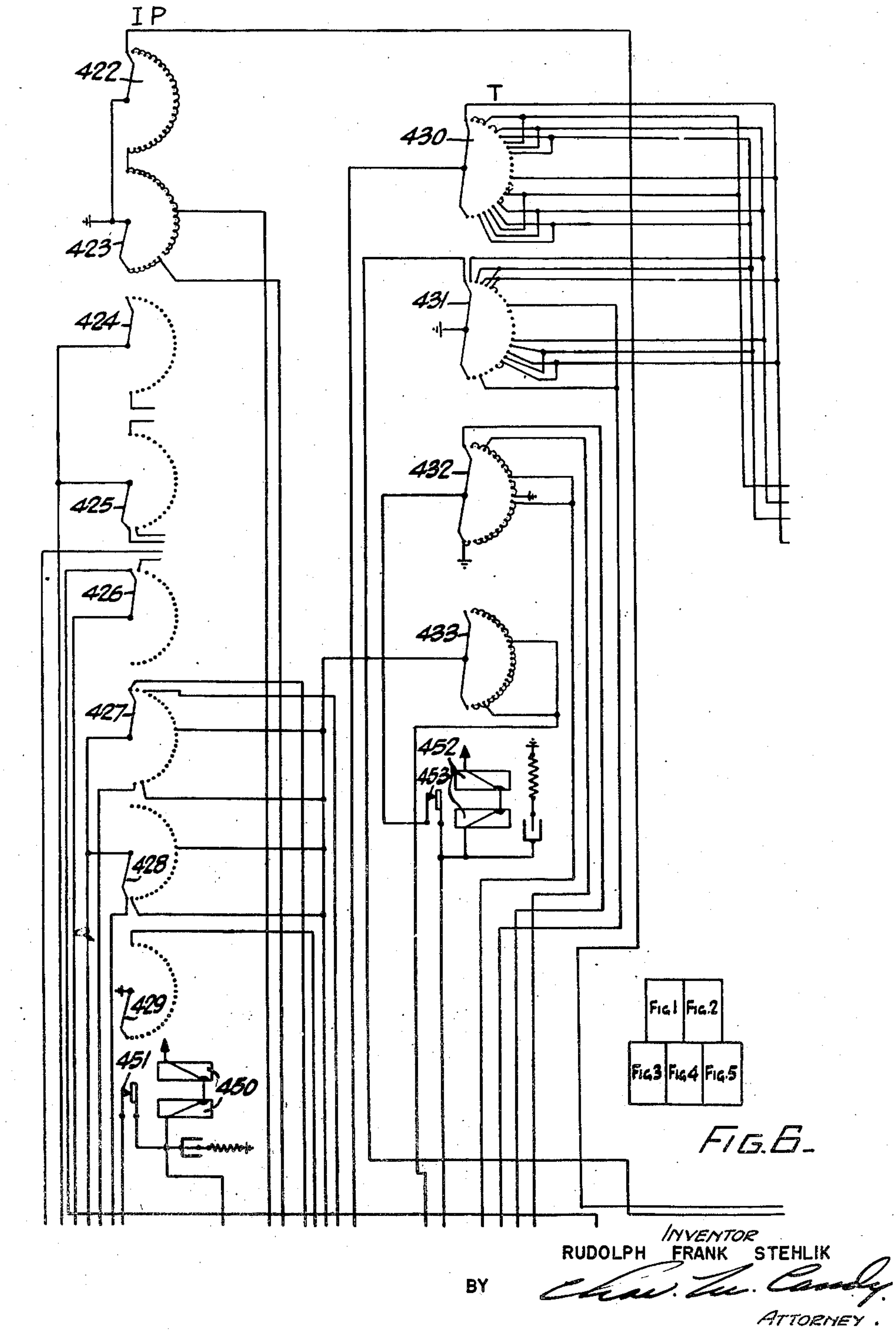
Figure 2:
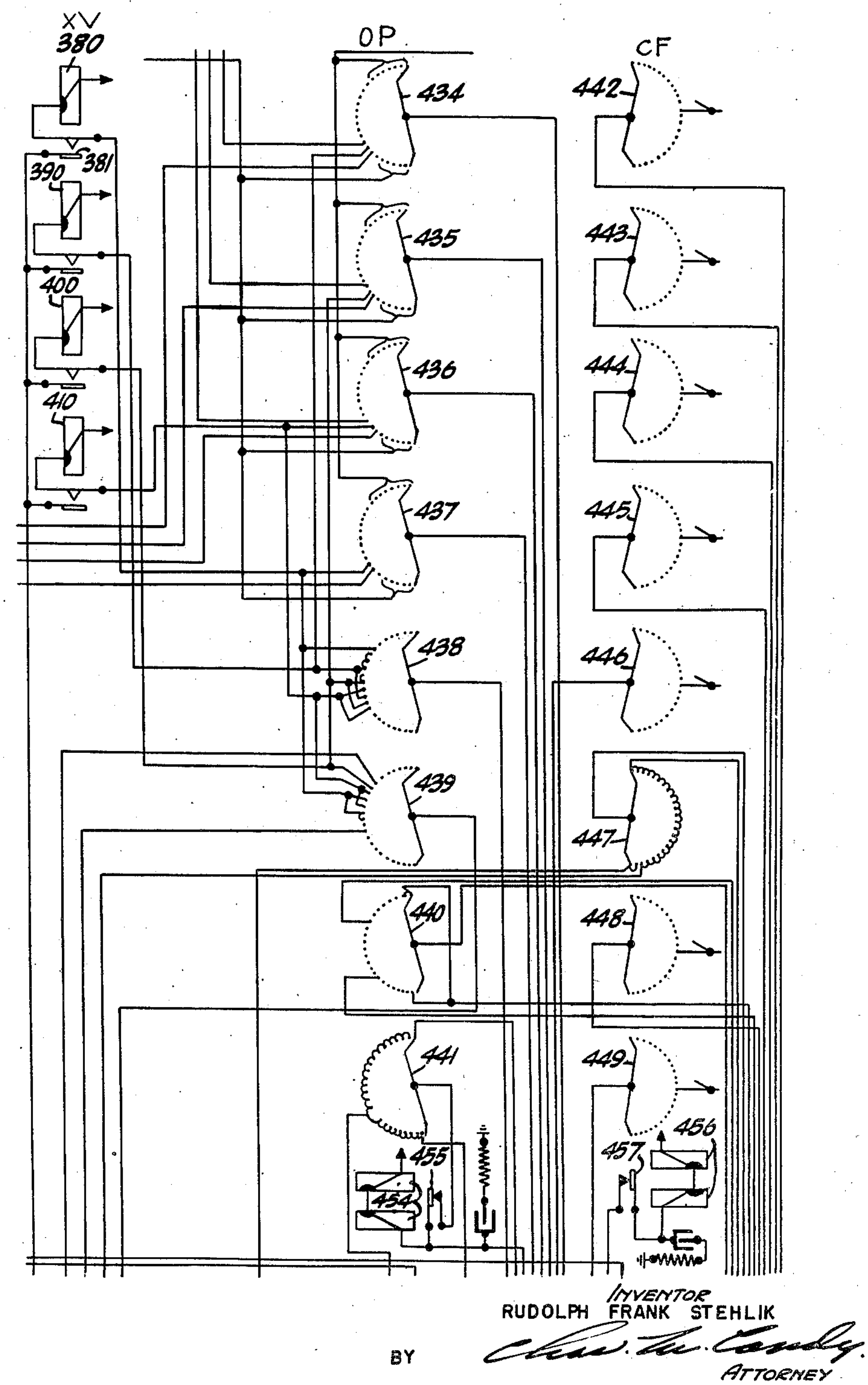
Figure 3:
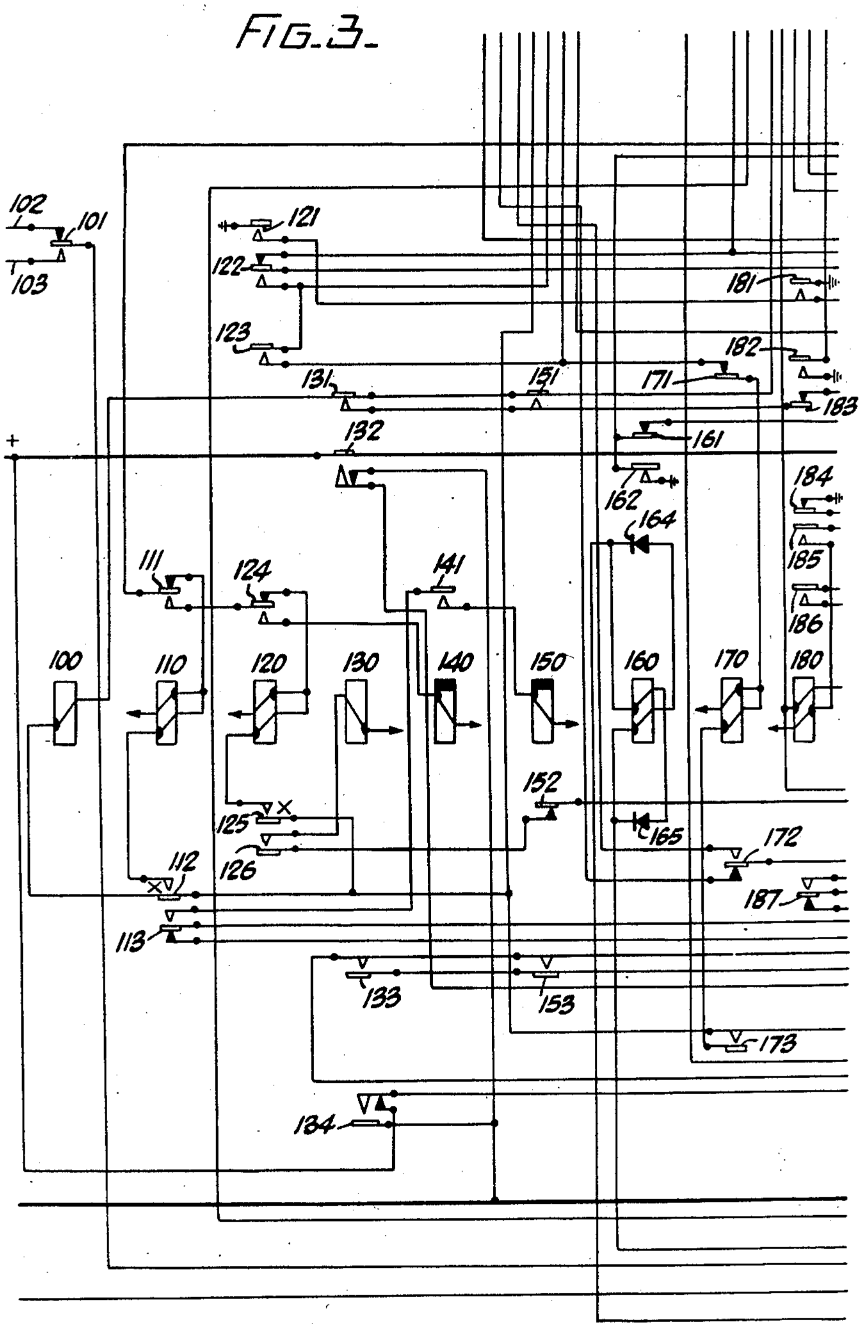
Figure 4:
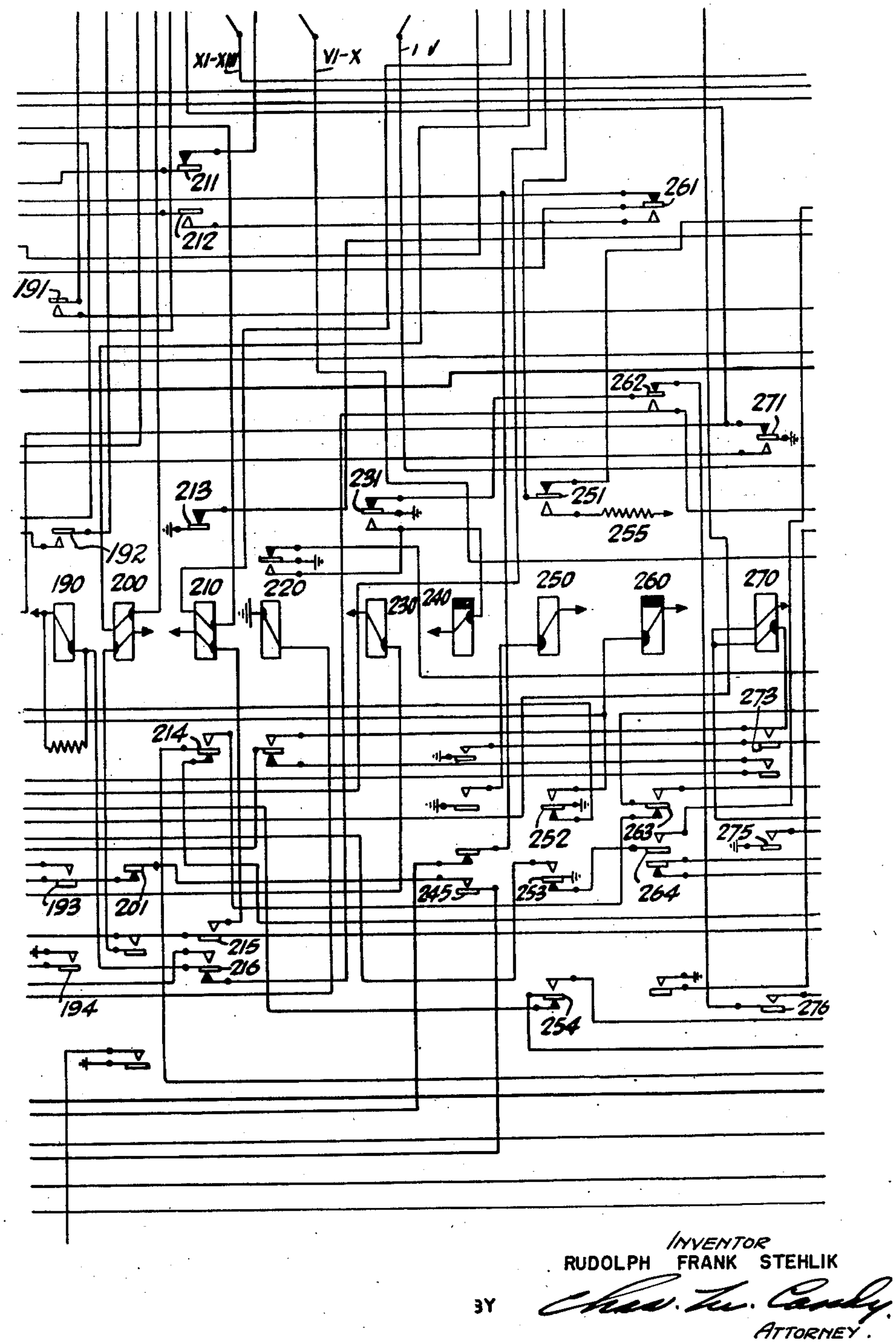
Figure 5:
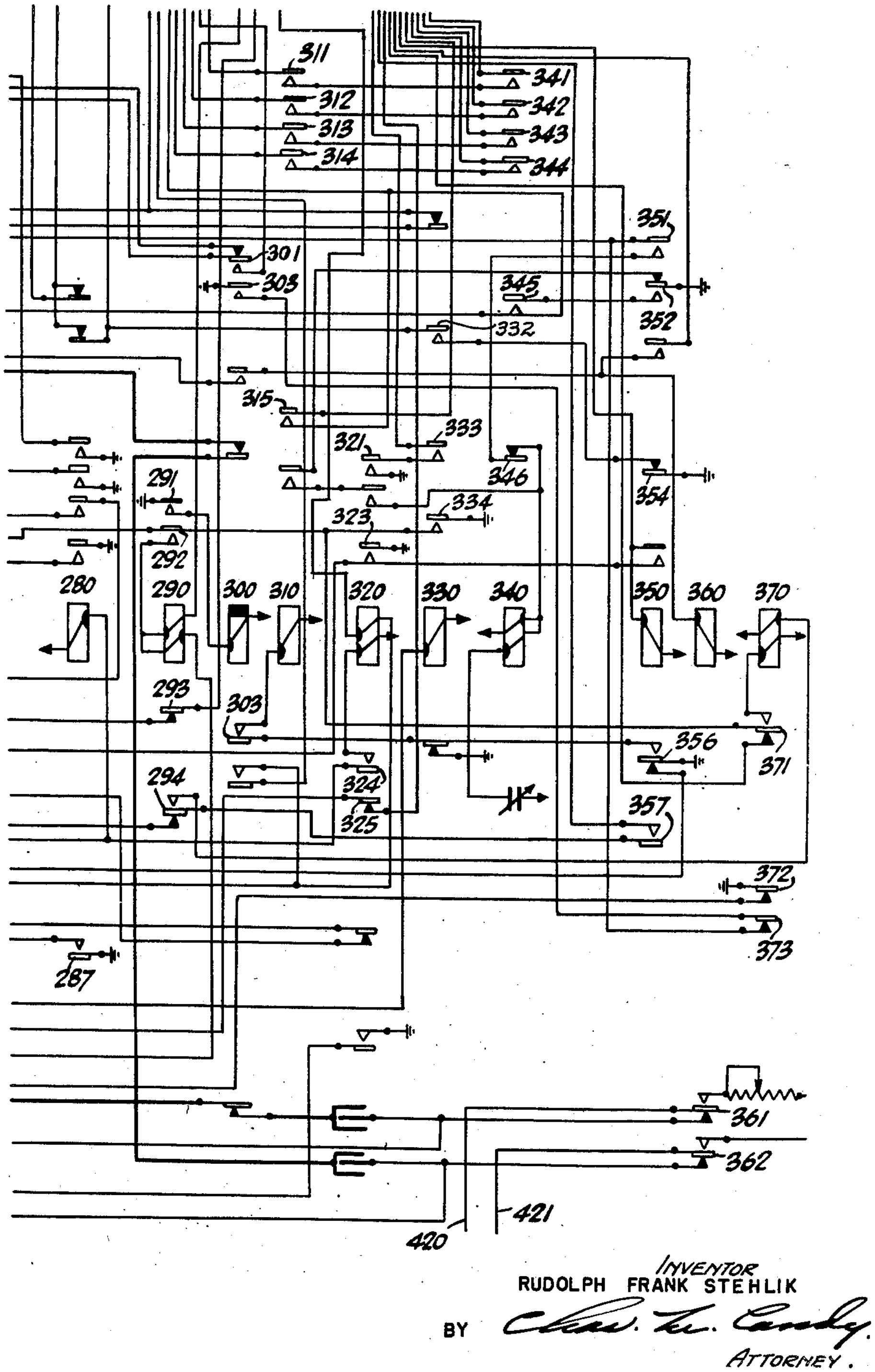

The present invention concerns improvements in or relating to the automatic reecording of calls in an automatic or semi-automatic telephone system and is an improvement in or modification of the arrangement described in Ostline's application, Serial No. 278,729 filed 12th June 1939, now Patent No. 2,272,475 granted February 10, 1942.

The general feature of the arrangement disclosed in said prior Ostline patent was for recording particulars of a telephone call at the end of a conversation. This rendered it possible to record only effective calls. It is an advantage to the administration also to record ineffective calls, not for charging purposes but for enabling them to obtain particulars as to the operation of the system, and it is therefore desirable that these calls should be printed but printed separately from the effective calls so as to avoid the necessity of sorting out the tickets, and it is one object of the present invention to provide means whereby this is done.

According therefore to one feature of the invention at the end of a connection due to the non-operation of a device which responds when a call is found to be effective, a recorder is adapted to be taken into use by which available particulars of the call are recorded.

Ineffective calls may be divided into three groups, namely, those calls which cannot be set up to the required subscriber because all available trunk lines leading to a subscriber or the subscriber himself is busy, those in which a subscriber does not answer the telephone either due to his absence or for any other reason, and those in which a subscriber calls a wrong number.

According therefore to a further feature of the invention, the effectiveness of a connection is determined by a device which is adapted to operate a short time after the called subscriber has replied, so that if the subscriber called is not the subscriber desired, the call can be classified as a non-effective call.

According to a still further feature of the invention in the case of calls which are not completed either due to a busy condition being encountered or the called subscriber failing to reply a recorder is adapted to be taken into use on the release of the connection by which available particulars of the call are recorded.

The first two classes of calls mentioned above are determined by the fact that the signal indicating that the called subscriber has lifted his receiver is not received. The third class of calls are conveniently determined by noting whether the subscriber has hung up within a few seconds.

A convenient time for this purpose is 6 or 7 seconds. In certain telephone administrations it has been decided not to make a charge for calls which do not last for longer than 6 or 7 seconds. On the other hand, it is desirable to make sure no advantage is being taken of this benefit by subscribers making a practice of limiting a large number of their most expensive calls to 6 or 7 seconds duration.

According therefore to a still further feature of the invention, on an ineffective connection one of a group of recorders is adapted to be taken into use on the release of the connection and means are provided which cause different indications to be made on the record to distinguish between connections which are ineffective for different reasons.

The provision of a record of these short calls enables the administration to determine if any particular subscriber is making a practice of such short calls so that they can take special steps with the subscriber in question.

The invention will be better understood from the following description of one embodiment taken in conjunction with the accompanying drawings comprising Figs. 1–5 which should be arranged to form a complete circuit in the manner shown in Fig. 6.

These figures show the circuits of the toll line control circuit of Figs. 1–10 of the prior Ostline patent referred to above suitably modified in accordance with the invention but with certain parts of the circuit which do not concern the present invention omitted for the sake of brevity.

Further the description of the circuits shown in Figs. 1–5 will only be given insofar as it is different from the prior specification and for this purpose it will be assumed that the toll line control circuit has been seized and has taken into use a converter to which the called party's number has been transmitted and which controls the operation of relay 360 in the toll line control circuit to cause the transmission of alternating current impulses over the junction line.

While impulses are being transmitted by relay 360 over the junction line under the control of the converter, the following relays in the toll line control circuit are energised: 170, 220, 230, 240, 250, 260, 270, 280, 290, 300, 310, and 320. Relays 220 and 230 are controlled over an impulsing circuit from the register translator in the originating exchange and according to this control are arranged to effect the storing of various items of information on groups of storage relays. These storage relays are not shown but the leads extending to the various groups are indicated by Roman numerals in Fig. 4. When all the items have been stored, wipers 422, 424, 426, 427 and 429 of the switch IP will be in position 3 while when the called party's number has been repeated to the converter, the wipers of the switch OP will be in position 8. When impulse transmission from the converter has ended, relays 290, 300 and 310 release, relay 320 remaining held. The above operations which are not essential to an understanding of the present invention will not be further described since they are substantially similar to those described in detail in said Ostline patent. It should be also understood however that the present arrangement is designed to operate in conjunction with a register translator of the type described in the Ostline Patent 2,369,071 granted February 6, 1945.

The subsequent operation of the toll line control circuit will now be described with reference to an effective call. On the release of relay 300, the following circuit is closed provided all the items of information have been received and stored in the toll line control circuit: earth at armature 287 (Fig. 5), wiper 427 of the switch IP on contact 3, upper winding of relay 210, contact 8 and wiper 439 of the switch OP, armature 251, resistance 255 to battery. Relay 210 operates and locks over its lower winding and armature 215 to earth at armature 287. The following self-interrupting circuit is now closed for the magnet 450 of the switch IP: earth, wiper 422 of the switch IP and bank multipling, armatures 122, 212, 261, self-interrupting contact 451, winding of magnet 450 to battery. The wipers of the switch IP are rotated until the above-traced circuit is opened when wiper 423 reaches contact 19. Wipers 423, 425, 428 and 429 are now in position 19.

The circuit remains in this condition until the connection has been set up to the called party. A momentary alternating current impulse is then transmitted over the junction line, the circuit extending as follows: conductor 420 of the junction line, armature 361, lower winding of relay 160 and rectifier 164 for positive half cycles and rectifier 165 and upper winding of relay 160 for negative half cycles, armature 362 to conductor 421 of the junction line. Relay 160 operates and at armature 162 extends earth over armature 301 in its resting position, armature 111, upper winding of relay 110 to battery. Relay 110 is a two-step relay which operates its "X" armature 112 only at this time. At the end of the A. C. impulse relay 160 releases and relay 110 then operates over both windings in series, armature 112 to earth at armature 287.

When the called party replies a further momentary A. C. impulse is transmitted over the junction line and relay 160 is re-operated. Relay 160 at armature 162 closes a circuit which extends as traced above, and thence over operated armature 111, armature 124, upper winding of relay 120 to battery. Relay 120 is also a two-step relay and at the end of the A. C. pulse operates fully over both windings in series, "X", armature 125, to earth at armature 287. Relay 120 in operating fully at armature 122 opens a further point in the above traced self-interrupting circuit for magnet 450 of the switch IP to prevent this circuit from becoming effective when the wipers of the switch IP are stepped as will be described later. In addition relay 120 at armature 126 closes a circuit from earth at armature 252, for relay 130.

Relay 130 in operating at armature 132 and 134 reverses the connection of relays 220 and 230 to the incoming conductor to give the necessary supervision and at armature 131 closes the following circuit: earth at armature 287, winding of relay 100, armatures 131, 183, contact 1 and wiper 432 of the switch T, interrupter contacts 453, winding of magnet 452 to battery. Relay 100 operates over this circuit but not the magnet. Relay 100 at armature 101 and its working contact connects the impulsing conductor 103 over armatures 245, 201, 133, 216 to battery over the winding of relay 190. Earth pulses at the rate of one per second are delivered over conductor 103 to energise relay 190. Relay 190 in operating at armature 194 repeats the impulses to the magnet 450 of the switch IP, the wipers of which therefore make one step per second. The stepping of the switch IP continues until wiper 427 reaches position 1, i. e. after seven steps. During this period of seven seconds no control is exerted over the switch T or the relay group XV on which the duration of the call is stored, this period forming the grace period.

If the connection is maintained beyond this grace period, earth is extended from armature 287 over wiper 427 on contact 1, armatures 131, 183, contact 1 and wiper 432 of the switch T, interrupter contacts 453, winding of magnet 452 to battery. In addition this earth is extended from armature 131 to the winding of relay 100 which is thus short-circuited and releases to disconnect conductor 103 and connect conductor 102 to relay 190. The magnet 452 is energised over the above self-interrupting circuit and the wipers of the switch T are stepped to position 2 where earth is extended from armature 184 to wiper 432 and thence to the magnet to cause the wipers to be stepped to position 4 to indicate the lapse of three minutes. This is done since the charge for a call is based on a minimum duration of three minutes.

As pointed out above, impulsing conductor 102 is now connected to relay 190. Impulses are delivered over this conductor at the rate of 12 per minute and when relay 190 operates on the receipt of an impulse a circuit is again completed at armature 194 for magnet 450 so that the wipers of the switch IP are stepped once every 5 seconds. At the end of the first minute wiper 427 of the switch IP is stepped to contact 13 and at the end of the second minute to contact 25 where a self-interrupting circuit is closed to step wipers 428 and 429 to contact 1. With wiper 429 on contact 1, earth is extended over wiper 429, upper winding of relay 180, contact 4 and wiper 432, interrupter contacts 453, winding of magnet 452 to battery. Relay 180 only operates and locks to earth over its lower winding and armature 185 to earth at armature 271. At the end of 2 minutes and 55 seconds, wiper 428 is stepped to contact 12 whereupon on the next operation of relay 190, i. e. at the end of the third minute, the following circuit is closed: earth on wiper 428, armatures 186, 192, winding of magnet 452 to battery. On the next release of relay 190, the wipers of the switch T are stepped to position 5. If the calling subscriber replaces his receiver before 2 minutes have elapsed, relay 130 is operated from earth at armature 252 over the upper winding of the relay and thence as before. It is to be noted that the self-interrupting circuit previously traced over wiper 432 and the bank multipling is now opened at armature 184 of relay 180.

The wipers of the switch T continue to make one step for each minute duration of the call and when wiper 433 reaches contact 10 the following circuit is closed at the end of the 10th minute: earth at armature 287, wiper 427 on contact 24, wiper 433 on contact 10, armature 191, winding of magnet 454 of the switch OP to battery. At the end of the impulse the magnet de-energises and steps the wipers of the switch OP to position 9. In this position of wipers 438 and 439 the digit 1 is stored so that the tens digit of the duration is indicated by the position of wipers 438 and 439 of the switch OP while the units digit is indicated by the position of wipers 430 and 431 of the switch T.

Suppose by way of example that the call lasts for 23 minutes. Then the wiper 438 and 439 of the switch OP will be on contact 10 while the wipers of the switch T will be on contact 4. On the release of the connection relays 220, 230, 240, 250 and 260 will release. Relay 260 is slow-to-release and on the release of relay 250 earth is extended for the release period of relay 260 over armatures 253, 264 to wipers 438 and 439 of the switch OP to cause the operation of the appropriate combination of relays of the storage group XV to store the tens portion of the duration. The operated relays lock to earth at armature 181. Relay 270 remains held over armature 273 to earth at armature 323 of relay 320 while the latter relay remains held over its lower winding, armature 324 to earth at armature 275 of relay 270. The following circuit is now closed: earth at armature 231 and its resting contact, armature 262 and its resting contact, armature 276, winding of relay 330 to battery.

Relay 330 at armature 332 closes the following self-interrupting circuit for magnet 454 of the switch OP: earth at armature 354, armature 332, bank multipling and wiper 441, interrupter contacts 455, winding of magnet 454 to battery. The wipers of the switch OP are thus rotated to contact 17 where the above traced circuit is opened. In this position however the following circuit is closed for relay 350: earth, armatures 321, 333, wiper 440 on contact 17, winding of relay 350 to battery.

The following self-interrupting circuit is closed for magnet 456 of the switch CF on the release of relay 260: earth, armatures 372, 214, 263, 293, interrupter contacts 457, winding of magnet 456 to battery. The wipers of the switch CF are thus rotated and when they arrive at contacts 17 to 23 they engage with the printer-controllers to which the information stored in the toll line control circuit is to be transferred. When an idle printer-controller is reached the following circuit is closed: earth at armature 334, armature 371, wiper 447 on one of contacts 17 to 23, bank multipling, armatures 187, 254, both windings of relay 290 in series, wiper 449 to battery in the printer-controller. Relay 290 operates and locks over its upper winding and armature 292 to earth at armature 334 and at armature 293 opens the above-traced circuit for magnet 456. It is to be noted that no idle converter will be taken into use while the wipers of the switch CF are rotating over any contacts prior to 17 since the test circuit over contacts 1–16 associated with wiper 447 is opened at armature 325 of relay 320.

Relay 290 in operating at armature 291 closes a circuit for relay 300 which in operating closes a circuit for relay 310 from earth at armature 356 over armature 303.

When relay 350 operates as described above, it closes at armature 351 the following circuit for the self-interrupting relay 340: earth, armatures 303, 373, 351, 346, upper winding of relay 340 to battery. Relay 340 serves as an impulse generating relay, the adjustable condenser in series with the lower winding enabling the duration of the impulses to be controlled. Relay 340 in operating at armature 345 extends earth from armature 352 to the winding of magnet 454 of the switch OP and over armature 315 and wiper 448 to the winding of a magnet of distributing switch in the printer-controller. As these switches step in synchronism the various items of information stored in the relay groups in the toll line control circuit are transferred over wipers 434–437 of the switch OP, armatures 311–314 and 341–344 and wipers 442 to 445 of the switch CF to the printer-controller. The manner in which this is effected is described in detail in the Ostline Patent 2,272,475 mentioned above and since it has no importance from the point of view of the present invention it will not be further described. It should be noted that the information is transferred from the storage groups in the following manner:

Group VIII, wipers of which OP on contact 17.
Group XV, wipers of which OP on contact 18.
Group XVI, wipers of which OP on contact 19.
Group XIV, wipers of which OP on contact 20.
Groups IX to XIII, wipers of which OP on contact 21–25.
Groups I to VII, wipers of which OP on contact 1–7.

When the information stored in group VII has been transferred, the wipers of the switch OP are stepped to position 8 when earth is extended over armatures 321, 333, wiper 440 on contact 8, armatures 357, 294, upper winding of relay 370 to battery. Relay 370 operates and locks over its lower winding and armature 371 to earth at armature 334 and at armature 373 opens the circuit to the impulse generating relay 340.

Battery is now disconnected in the printer-controller from wiper 449 and relay 290 releases followed by relays 300 and 310. Relay 290 at armature 294 extends the earth on wiper 440 to the upper winding of relay 270 thereby shunting the lower winding of the relay. Under these conditions relay 270 releases followed by relays 280 and 320 together with all the relays controlled thereby. Homing circuits are now closed for the various switches and when the wipers of the switch IP reach the home position, earth is extended over wiper 422 on contact 1 to the winding of relay 320 and the toll line control circuit is ready for use on another call.

The above operations take place on an effective call. Consideration will now be given to the operation of the circuit on ineffective calls. Ineffective calls may be due firstly to the fact that the called subscriber does not reply either because he is absent or for any other reason: secondly to the fact that the called subscriber is busy or a busy condition is reached during the setting up of the connection and thirdly to the fact that a wrong number has been obtained.

Printing of the available information takes place on these ineffective calls and on calls which are terminated within 7 seconds of the reply of the called subscriber, it is arranged for the digit "0" to be printed on the ticket in the space provided for the duration of the call. On other ineffective calls however this space is left blank. The reason for this discrimination is that it is useful for the authorities to keep track of all calls which are terminated within the grace period since some subscribers may endeavour to limit their long distance calls to less than this period.

It will be understood from the above description that the seizure of a printer-controller is dependent upon the release of the connection and hence when a calling party hangs up on an ineffective call, the circuit will operate to cause a printer-controller to be seized. It is to be noted however that since relay 180 is never operated on an ineffective call, the test circuit over wiper 447 of the switch CF and contacts 17 to 23 is opened and that extending over contacts 24 and 25 is closed. Contacts 24 and 25 of the switch CF lead to printer-controllers which are specially adapted for the printing of ineffective calls.

A detailed description will now be given of the operations which take place on an ineffective call and for this purpose it will be assumed that the calling party has dialled the wrong number. On the reply of the called party, relay 120 operates as previously described followed by relays 130 and 100. Timing of the call begins but the calling party replaces his receiver before wipers 427 and 429 of the switch IP reach contact 1. The wipers of the switch T thus remain on contact 1 while the wipers of the switch OP remain on contact 8.

When the calling party replaces his receiver, relays 220, 230, 240 and 250 release and relay 250 at armature 252 opens the circuit for relay 260. Relay 260 however is slow to release and during its release period earth is extended from armature 253 in its resting position, armature 264, wiper 438 on contact 8, winding of relay 380 to battery. Relay 380 is one of the storage relays of group XV and its operation serves to store the digit "0." Relay 380 in operating locks over armature 381 to earth at armature 121.

When relay 260 finally releases earth is removed from wiper 438 and in addition the circuit traced above is closed for relay 330 and the wipers of the switch CF are rotated to contact 17 as previously described and thence to contact 22. The circuit operations are now similar to those previously described except that, as pointed out above, the test circuit now extends over contacts 24 and 25 associated with wiper 447 and a special printer-controller will be taken into use to which the available information is transferred and which controls the operation of a printer.

Where the call is ineffective owing to the non-reply of the called party or due to a busy condition, the operation of the circuit is similar to that described above except that relays 110 and 120 are not operated. Hence there is no locking circuit for relay 380 of the storage group XV and although this relay is operated it is released when wiper 438 moves off contact 8. Thus on such ineffective calls no printing takes place in the space on the ticket which is reserved for the duration of the call.

I claim:

1. In a telephone system in which storage apparatus is provided for storing certain items of record information pertaining to a telephone connection from a calling line to a called line and in which recording apparatus is provided for recording the stored items of record information; record controlling apparatus included in said connection comprising a first relay controlled incident to the answering of a call extended to said called line, a second relay controlled incident to the release of said connection for establishing a time item indicative of the total elapsed time said connection is maintained, means including said second relay controlled incident to the release of a connection extended to said called line for operating said recorder to record said stored items of record information pertaining to said connection whether or not said first relay is controlled, and means including said second relay for selectively operating said recorder to record said established time item only in the event said first relay is controlled incident to the answering of a call.

2. In a telephone system in which storage apparatus is provided for storing certain items of record information pertaining to a telephone connection from a calling line to a called line and in which recording apparatus is provided for recording the stored items of record information; a trunk circuit included in said connection comprising a first device operated incident to the answering of a call extended to said called line, a second device operated incident to the release of a connection extended to said called line for establishing a time item indicative of the total elapsed time the answered call is maintained, means including said second device control in the event said first device is operated incident to the answering of the call extended to said called line for operating said recorder to record both said stored items of record information pertaining to said connection and said established time item, means including said second device controlled in the event said first device is not operated incident to the extension of a call to said called line for operating said recorder to record said stored items of record information pertaining to the connection extended to said called line and for preventing the operation of said recorder to record a time item.

3. In a telephone system in which storage apparatus is provided for storing certain items of record information pertaining to a telephone connection from a calling line to a called line and in which recording apparatus is provided for recording the stored items of record information; a trunk circuit included in said connection comprising a first device operated incident to the answering of a call extended to said called line, a second device operated incident to the release of a connection extended to said called line for establishing a time item indicative of the total elapsed time the answered call is maintained, first means operative to control said recorder to record said stored items of record information pertaining to a connection, second means operative to control said recorder to record an established time item, relay means including said second device controlled incident to the release of a connection extended to a said called line either before or after said first device is operated for operating said first means to control said recorder, and additional relay means including said second device controlled incident to the release of a connection extended to said called line after said first device is operated for operating said second means to control said recorder.

4. In a telephone system in which storage apparatus is provided for storing certain items of record information pertaining to a telephone connection from a calling line to a called line and in which recording apparatus is provided for recording the stored items of record information; a trunk circuit included in said connection comprising a first device operated incident to the answering of a call extended to said called line, a second device controlled incident to the release of a connection extended to said called line within a predetermined elapsed time interval after said first device is operated for selecting said recorder and for controlling said recorder to record said stored items of record information and an arbitrary time item indicating that the connection extended to the called line has been released prior to the elapse of said predetermined time interval and that no charge is to be made for the call, means including said second device controlled incident to the release of a connection extended to said called line subsequent to the elapse of said predetermined elapsed time interval after said first device is operated for selecting said recorder and for controlling said recorder to record said stored items of record information and a time item indicating the chargeable elapsed time interval said connection is maintained, and means including said second device controlled incident to the release of a connection extended to said called line before said first device is operated for selecting said recorder and for controlling said recorder to record said stored items of record information and for preventing said recorder from recording a time item in order to indicate that the connection to the called line has been released prior to the operation of said first device.

5. In a telephone system in which storage appaartus is provided for storing certain items of record information pertaining to a telephone connection from a calling line to a called line and in which recording apparatus is provided for recording the stored items of record information; a trunk circuit included in said connection comprising a timer having a first position indicative of a non-answered call and a second position indicative of an answered call that is released prior to the elapse of a non-chargeable predetermined time interval and a third position indicative of an answered call that is released after the elapse of the non-chargeable predetermined time interval, a first relay controlled incident to the answering of a call extended to said called line for operating said timer from said first position to said second position, a second relay automatically controlled after said connection to said called line has been maintained for a time interval greater than said predetermined time interval for operating said timer from said second position to said third position, and a third relay controlled incident to the release of a connection extended to said called line for controlling said recorder to record said stored item of record information and to produce a distinction on the record indicative of the particular one of said three positions of said timer at the time of said release.

6. In a telephone system in which storage apparatus is provided for storing certain items of record information pertaining to a telephone connection from a calling line to a called line and in which recording apparatus is provided for recording the stored items of record information; a trunk circuit included in said connection comprising a timer having a first positions indicative of a non-answered call and a second position indicative of an answered call that is released prior to the elapse of a non-chargeable predetermined time interval and a third position indicative of an answered call that is released after the elapse of the non-chargeable predetermined time interval, a first relay controlled incident to the answering of a call extended to said called line for operating said timer from said first position to said second position, a second relay automatically controlled after said connection to said called line has been maintained for a time interval greater than said predetermined time interval for operating said timer from said second position to said third position, means for controlling said recorder to record said stored items of record information pertaining to said connection, and a third relay controlled incident to the release of a connection extended to said called line for controlling said recorder to indicate the particular one of said three positions of said timer at the time of said release.

7. In a telephone system in which storage apparatus is provided for storing certain items of record information pertaining to a telephone connection from a calling line to a called line and in which recording apparatus is provided for recording the stored items of record information; a trunk circuit included in said connection comprising a first device operated incident to the answering of a call extended to said called line, relay means controlled from said calling line for releasing said connection prior to said operation of said first device or within a non-chargeable elapsed time interval following the operation of said device or after the elapse of said non-chargeable time interval following the operation of said device, a second device controlled by said relay means incident to the release of said connection, for selectively operating said recorder to record said stored items of record information, and additional means controlled by said relay means for selectively operating said recorder to produce a distinction on the record indicative of the release of said connection prior to answering by the called party or during a non-chargeable period after answering or after the elapse of the non-chargeable period after answering.

8. In a telephone system in which storage apparatus is provided for storing certain items of record information pertaining to a telephone connection from a calling line to a called line and in which first and second recorders are provided for recording the stored items of record information; record controlling apparatus included in said connection comprising a first relay controlled incident to the answering of a call extended to said called line, a second relay controlled incident to the release of said connection extended to said called line prior to operation of said first relay for selecting said first recorder and controlled incident to the release of said connection extended to said called line subsequent to operation of said first relay for selecting said second recorder, and additional relay means for operating said selected first or second recorder to record said stored items of record information pertaining to said connection.

9. In a telephone system in which storage apparatus is provided for storing certain items of record information pertaining to a telephone connection from a calling line to a called line and in which first and second recorders are provided for recording the stored items of record information; record controlling apparatus included in said connection comprising a device, a first relay controlled incident to the answering of a connection extended to said called line for operating said device, means including a release relay operated incident to the release of said connection extended to said called line for selecting said first or said second recorder depending upon the operated or the non-operated condition of said device, and control means for controlling the selected one of said recorders to record said stored items of record information pertaining to said connection.

10. In a telephone system in which storage apparatus is provided for storing certain items of record information pertaining to a telephone connection from a calling line to a called line and in which first and second recorders are provided for recording the stored items of record information; a trunk circuit included in said connection comprising a first device operated incident to the answering of a connection extended to said called line, a second device controlled incident to the release of said connection after the operation of said first device for establishing a time item indicative of the total elapsed time the answered connection is maintained, means including said second device controlled incident to the release of said connection prior to the control of said first device for preventing the establishment of said time item, a third device selectively controlled by said second device in accordance with the operated or non-operated condition of said first device for selecting said first recorder or said second recorder, and means for thereafter controlling said first recorder to record said stored items of record information and said established time item or for controlling said second recorder to record only said stored items of record information.

11. In a telephone system in which storage apparatus is provided for storing certain items of record information pertaining to a telephone connection from a calling line to a called line and in which first and second groups of recorders are provided for recording the stored items of record information; a trunk circuit included in said connection comprising a first device controlled incident to the answering of a call extended to said called line, a first relay controlled incident to the termination of said connection for establishing a time item indicative of the total elapsed time said connection is maintained by said calling and called lines, means including said first relay controlled in the event said first device is not operated incident to the extension of a call to said called line for preventing the establishment of a time item, a second device selectively controlled by said first relay incident to the termination of a connection extended to said called line for selecting an idle one of the recorders in said first group in the event said time item is established and for selecting an idle one of the recorders in said second group in the event said time item is not established, and means for controlling a selected first or second group recorder to record said stored items of record information and for controlling only a selected first group recorder to record said established time item.

12. In a telephone system in which storage apparatus is provided for storing certain items of record information pertaining to a telephone connection from a calling line to a called line and in which first and second groups of recorders are provided for recording the stored items of record information; a trunk circuit included in said connection comprising a first device controlled incident to the answering of a call extended to said called line, a first relay controlled incident to the termination of said connection for establishing a time item indicative of the total elapsed time said connection is maintained by said calling and called lines, means including said first relay controlled in the event said call extended to said called line is not answered for preventing the establishment of a time item, means including a second device selectively controlled by said first relay incident to the release of said connection subsequent to the operation of said first device for selecting an idle one of said recorders in said first group and for controlling said selected first group recorder to record said stored items of record information and said established time item, and additional means including said second device selectively controlled by said first relay incident to the release of said connection prior to the operation of said first device for selecting an idle one of said recorders in said second group and for controlling said selected second group recorder to record only said stored items of record information.

13. In a telephone system in which storage apparatus is provided for storing certain items of record information pertaining to a telephone connection from a calling line to a called line and in which first and second groups of recorders are provided for recording the stored items of record information; record controlling apparatus included in said connection comprising a first relay controlled incident to the answering of a connection extended to said called line, means for selecting an idle recorder in said first group or in said second group of recorders, a second relay controlled incident to the release of said connection subsequent to the operation on said first relay for controlling said recorder selecting means to select an idle recorder in said first group, means including said second relay controlled incident to the release of said connection prior to the operation of said first relay for controlling said recorder selecting means to select an idle recorder in said second group, and means controlled incident to the selection of an idle recorder in said first group or in said second group for controlling the selecting recorder to record said stored items of record information pertaining to said connection.

14. In a telephone system in which storage apparatus is provided for storing certain items of record information pertaining to a telephone connection from a calling line to a called line and in which first and second recorders are provided for recording the stored items of record information, record controlling apparatus included in said connection comprising a first relay controlled incident to the answering of a connection extended to said called line, means including a second relay controlled incident to release of said connection extended to said called line within a predetermined short-answer elapsed time interval after the operation of said first relay for selecting said first recorder, means including said second relay controlled incident to the release of said connection extended to said called line after the elapse of said predetermined short-answer time interval after the operation of said first relay for selecting said second recorder, and means controlled incident to the selection of said first or said second recorder for controlling the selected recorder to record said stored items of record information, whereby the record produced by said first recorder indicates that the connection between said calling and called lines is an ineffective non-chargeable call and the record produced by said second recorder indicates the connection is an effective chargeable call.

15. In a telephone system in which storage apparatus is provided for storing certain items of record information pertaining to a telephone connection from a calling line to a called line and in which first and second groups of recorders are provided for recording the stored items of record information; record controlling apparatus included in said connection comprising a first relay controlled incident to the answering of a connection extended to said called line, means for selecting an idle recorder in said first group or in said second group of recorders, means including a second relay controlled incident to the release of said connection extended to said called line within a predetermined short-answer elapsed time interval after the operation of said first relay for controlling said recorder selecting means to select an idle recorder in said first group of recorders, means including said second relay controlled incident to the release of said connection extended to said called line after the elapse of said predetermined short-answer time interval after the operation of said first relay for controlling said recorder selecting means to select an idle recorder in said second group of recorders, and means controlled incident to the selection of a recorder in said first group or in said second group for controlling the selected recorder to record said stored items of record information, whereby the record produced by a recorder in said first group indicates that the connection between said calling and called lines is an ineffective non-chargeable call and the record produced by a recorder in said second group indicates that the connection is an effective chargeable call.

16. In a telephone system in which storage apparatus is provided for storing certain items of record information pertaining to a telephone connection from a calling line to a called line and in which first and second recorders are provided for recording the stored items of record information; a trunk circuit included in said connection comprising a timer, a first relay operated incident to the answering of a connection extended to said called line for initiating operation of said timer, a second relay operated incident to the release of said connection for terminating the operation of said timer in order to establish a time item indicative of the total elapsed time said connection is maintained, additional relay means controlled in the event said first relay is not operated at the time said second relay is operated incident to the release of said connection and controlled in the event said first relay is operated at the time said second relay is operated incident to the release of said connection within a predetermined non-chargeable elapsed time interval of said timer for selecting said first recorder, control means controlled incident to the selection of said first recorder for controlling said first recorder to record an arbitrary time item indicative of the release of said connection prior to the elapse of said predetermined non-chargeable elapsed time interval and for controlling said first recorder to record said stored items of record information regardless of the operated or non-operated condition of said first relay, said additional relay means controlled in the event said first relay is operated at the time said second relay is operated incident to the release of said connection after the elapse of said predetermined non-chargeable time interval of said timer for selecting said second recorder, and additional control means controlled incident to the selection of said second recorder for controlling said second recorder to record the time item established by said timer indicative of the chargeable elapsed time of said connection and to record said stored items of record information.

17. In a telephone system in which storage apparatus is provided for storing certain items of record informatiion pertaining to a telephone connection from a calling line to a called line and in which first and second recorders are provided for recording the stored items of record information; a trunk circuit included in said connection comprising a first relay controlled incident to the answering of a call extended to said called line, means including a second relay operated incident to the release of said connection from said calling line before said first relay is operated by answering on said called line for selecting said first recorder and for controlling said first recorder to record said stored items of record information, means including said second relay operated incident to the release of said connection from said calling line within a predetermined non-chargeable elapsed time interval after said first relay is operated by answering on said called line for selecting said first recorder and for controlling said first recorder to record said stored items of record information and an arbitrary time item indicative of the release of said answered connection within a non-chargeable elapsed time interval, and means including said second relay operated incident to the release of said connection from said calling line after the elapse of said predetermined non-chargeable time interval after said first relay is operated by answering on said called line for selecting said second recorder and for controlling said second recorder to record said stored items of record information and a time item indicative of the chargeable elapsed time interval said connection is maintained.

RUDOLPH FRANK STEHLIK.

REFERENCES CITED

The following references are of record in the file of this patent:

UNITED STATES PATENTS

| Number | Name | Date |
|---|---|---|
| 1,194,378 | Goodrum | Aug. 15, 1916 |
| 1,848,174 | Irvine et al. | Mar. 8, 1932 |
| 2,272,475 | Ostline | Feb. 10, 1942 |
| 2,273,165 | Wright | Feb. 17, 1942 |
| 2,369,071 | Ostline | Feb. 6, 1945 |
| 2,513,112 | Shepherd | June 27, 1950 |

FOREIGN PATENTS

| Number | Country | Date |
|---|---|---|
| 516,348 | Great Britain | Jan. 1, 1940 |
| 532,813 | Great Britain | Jan. 31, 1941 |